United States Patent
McCauley et al.

(10) Patent No.: US 8,987,395 B2
(45) Date of Patent: Mar. 24, 2015

(54) BULK POLYMERIZATION OF CONJUGATED DIENES USING A NICKEL-BASED CATALYST SYSTEM

(75) Inventors: Kevin M. McCauley, Akron, OH (US); Steven Luo, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/976,284

(22) PCT Filed: Dec. 30, 2011

(86) PCT No.: PCT/US2011/068069
§ 371 (c)(1),
(2), (4) Date: Jun. 26, 2013

(87) PCT Pub. No.: WO2012/092547
PCT Pub. Date: Jul. 5, 2012

(65) Prior Publication Data
US 2013/0281642 A1 Oct. 24, 2013

Related U.S. Application Data

(60) Provisional application No. 61/428,936, filed on Dec. 31, 2010.

(51) Int. Cl.
| | | |
|---|---|---|
| C08F 4/70 | (2006.01) | |
| C08F 4/80 | (2006.01) | |
| C08F 2/02 | (2006.01) | |
| C08F 36/00 | (2006.01) | |
| C08F 136/06 | (2006.01) | |
| C08F 36/04 | (2006.01) | |

(52) U.S. Cl.
CPC ............. C08F 136/06 (2013.01); C08F 36/04 (2013.01); Y10S 526/902 (2013.01)
USPC ........ 526/172; 526/169.1; 526/169; 526/161; 526/137; 526/144; 526/902; 526/335

(58) Field of Classification Search
CPC ........ C08F 4/80; C08F 4/7098; C08F 4/7095; C08F 4/70; C08F 4/52; C08F 2/02; C08F 36/00; C08F 36/04; C08F 136/06
USPC .......... 526/169.1, 169, 172, 137, 144, 335, 1, 526/161, 902
See application file for complete search history.

(56) References Cited

U.S. PATENT DOCUMENTS

| | | |
|---|---|---|
| 3,170,904 A | 2/1965 | Ueda et al. |
| 3,170,905 A | 2/1965 | Ueda et al. |
| 3,170,907 A | 2/1965 | Ueda et al. |
| 3,464,965 A | 9/1969 | Yasunaga et al. |
| 3,471,462 A | 10/1969 | Matsumoto et al. |
| 3,483,177 A | 12/1969 | Throckmorton et al. |
| 3,487,063 A | 12/1969 | Throckmorton et al. |
| 3,528,957 A | 9/1970 | Throckmorton et al. |
| 3,624,000 A | 11/1971 | Throckmorton |
| 3,753,967 A | 8/1973 | Graff et al. |
| 3,769,270 A | 10/1973 | Saltman et al. |
| 3,844,974 A | 10/1974 | Throckmorton |
| 3,856,764 A | 12/1974 | Throckmorton et al. |
| 3,910,869 A | 10/1975 | Throckmorton |
| 3,962,200 A * | 6/1976 | de Zarauz ..................... 526/78 |
| 3,962,375 A | 6/1976 | Throckmorton et al. |
| 3,985,941 A | 10/1976 | Pierson et al. |
| 4,020,255 A | 4/1977 | Schoneman et al. |
| 4,096,322 A | 6/1978 | Throckmorton |
| 4,102,817 A | 7/1978 | Throckmorton et al. |
| 4,155,880 A | 5/1979 | Throckmorton et al. |
| 4,304,885 A | 12/1981 | Omori et al. |
| 4,522,988 A | 6/1985 | Kang et al. |
| 4,522,989 A | 6/1985 | Kang |
| 5,100,982 A | 3/1992 | Castner |
| 5,412,045 A | 5/1995 | Osman et al. |
| 5,580,930 A | 12/1996 | Kang et al. |
| 5,596,053 A | 1/1997 | Kang et al. |
| 5,698,643 A | 12/1997 | Donbar et al. |
| 5,955,553 A | 9/1999 | Oziomek et al. |
| 6,656,867 B2 | 12/2003 | Kerns et al. |
| 7,081,504 B2 * | 7/2006 | Rachita et al. ................ 526/141 |

(Continued)

FOREIGN PATENT DOCUMENTS

| | | | |
|---|---|---|---|
| EP | 0236253 B1 | 12/1991 | |
| EP | 466 288 A1 * | 1/1992 | ............... C08F 4/70 |
| EP | 0466288 A1 | 1/1992 | |
| EP | 1939221 A2 | 7/2008 | |
| EP | 2022803 A2 | 2/2009 | |
| GB | 2 186 880 A * | 8/1987 | ............... C08F 4/00 |
| GB | 2186880 A | 8/1987 | |

OTHER PUBLICATIONS

International Preliminary Report on Patentability for Intl. Appl. No. PCT/US2011/068079 filed Dec. 30, 2011; report mailing date Jul. 11, 2013; 12 pages.
Sakata, Ryozo et al., "Effect of Unsaturated Hydrocarbons on the Polymerization of Butadiene with Nickel Catalyst," Die Makromolekulare Chemie, vol. 139, Issue 1, pp. 73-81 (1970).
Throckmorton, M.C. et al., "An HF-Nickel-R3Al Catalyst System for Producing High cis-1,4-Polybutadiene," Rubber Chemistry and Technology, vol. 45, Issue 1, pp. 268-277 (1972).

(Continued)

*Primary Examiner* — Rip A Lee
(74) *Attorney, Agent, or Firm* — Meredith E. Hooker; Arthur M. Reginelli

(57) ABSTRACT

A process for preparing a polydiene, the process comprising the step of polymerizing conjugated diene monomer with a nickel-based catalyst system, where said step of polymerizing takes place within a polymerization mixture that includes less than 20% by weight of organic solvent based on the total weight of the polymerization mixture, where the temperature of the polymerization mixture is maintained below 34° C. during said step of polymerizing, and where the conversion of the conjugated diene monomer is maintained below 30%.

17 Claims, No Drawings

(56) References Cited

U.S. PATENT DOCUMENTS

| | | |
|---|---|---|
| 7,094,849 B2 * | 8/2006 | Luo et al. ............ 526/164 |
| 7,351,776 B2 * | 4/2008 | Tartamella et al. ......... 526/65 |
| 7,572,867 B2 | 8/2009 | Tartamella et al. |
| 7,585,805 B2 * | 9/2009 | Luo ................ 502/119 |
| 7,741,418 B2 | 6/2010 | Luo et al. |
| 7,825,201 B2 | 11/2010 | Luo et al. |
| 7,977,437 B2 | 7/2011 | Luo et al. |
| 8,324,329 B2 * | 12/2012 | Luo et al. ............. 526/78 |
| 8,372,925 B2 * | 2/2013 | Qin et al. ............ 526/136 |
| 8,623,975 B2 | 1/2014 | Luo et al. |
| 2008/0255327 A1 | 10/2008 | Qin et al. |
| 2013/0274430 A1 * | 10/2013 | McCauley et al. ........ 526/132 |
| 2013/0281642 A1 * | 10/2013 | McCauley et al. ........ 526/131 |
| 2014/0011963 A1 | 1/2014 | McCauley |

OTHER PUBLICATIONS

Yoshimoto, Toshio et al., "Kinetic Study of cis-1,4 Polymerization of Butadiene with Nickel Carboxylate/Boron Trifluoride Etherate/Triethylaluminum Catalyst," Die Makromolekulare Chemie, vol. 139, Issue 1, pp. 61-72 (1970).

Mettler, Rolf-Martin, Mar. 23, 2012 International Search Report with Written Opinion from PCT Application No. PCT/US2011/068069 (11 pp.).

Mettler, Rolf-Martin, Mar. 23, 2012 International Search Report with Written Opinion from PCT Application No. PCT/US2011/068079 (10 pp.).

U.S. Appl. No. 61/610,536, filed Mar. 14, 2012 to McCauley, et al.

U.S. Appl. No. 61/560,941, filed Nov. 17, 2011 to McCauley, et al.

* cited by examiner

BULK POLYMERIZATION OF CONJUGATED DIENES USING A NICKEL-BASED CATALYST SYSTEM

This application claims the benefit of U.S. Provisional Application Ser. No. 61/428,936, filed on Dec. 31, 2010, which is incorporated herein by reference.

FIELD OF THE INVENTION

One or more embodiments of the present invention relate to a method for the bulk polymerization of conjugated dienes by employing a nickel-based catalyst system.

BACKGROUND OF THE INVENTION

Synthetically produced polymers such as polydienes are used in the art of manufacturing tires. Synthetic polymers that undergo strain-induced crystallization provide advantageous properties such as tensile strength and abrasion resistance. Thus, cis-1,4-polydienes with high cis-1,4-linkage content, which exhibit the increased ability to undergo strain-induced crystallization, have been advantageously employed.

Polydienes may be produced by solution polymerization, wherein conjugated diene monomer is polymerized in an inert solvent or diluent. The solvent serves to solubilize the reactants and products, to act as a carrier for the reactants and product, to aid in the transfer of the heat of polymerization, and to help in moderating the polymerization rate. The solvent also allows easier stirring and transferring of the polymerization mixture (also called cement), since the viscosity of the cement is decreased by the presence of the solvent. Nevertheless, the presence of solvent presents a number of difficulties. The solvent must be separated from the polymer and then recycled for reuse or otherwise disposed of as waste. The cost of recovering and recycling the solvent adds greatly to the cost of the polymer being produced, and there is always the risk that the recycled solvent after purification may still retain some impurities that will poison the polymerization catalyst. In addition, some solvents such as aromatic hydrocarbons can raise environmental concerns. Further, the purity of the polymer product may be affected if there are difficulties in removing the solvent.

Polydienes may also be produced by bulk polymerization (also called mass polymerization), wherein conjugated diene monomer is polymerized in the absence or substantial absence of any solvent, and, in effect, the monomer itself acts as a diluent. Since bulk polymerization is essentially solventless, there is less contamination risk, and the product separation is simplified. Bulk polymerization offers a number of economic advantages including lower capital cost for new plant capacity, lower energy cost to operate, and fewer people to operate. The solventless feature also provides environmental advantages, with emissions and waste water pollution being reduced.

Despite its many advantages, bulk polymerization requires very careful temperature control, and there is also the need for strong and elaborate stirring equipment since the viscosity of the polymerization mixture can become very high. In the absence of added diluent, the high cement viscosity and exotherm effects can make temperature control very difficult. Consequently, local hot spots may occur, resulting in degradation, gelation, and/or discoloration of the polymer product. In the extreme case, uncontrolled acceleration of the polymerization rate can lead to disastrous "runaway" reactions. To facilitate the temperature control during bulk polymerization, it is desirable that a catalyst gives a reaction rate that is sufficiently fast for economical reasons but is slow enough to allow for the removal of the heat from the polymerization exotherm in order to ensure the process safety.

Nickel-based catalyst systems including a nickel-containing compound, an organoaluminum compound, and a fluorine-containing compound may be employed for polymerizing conjugated dienes to form cis-1,4-polydienes. The fluorine-containing compounds may include boron trifluoride and complexes of boron trifluoride with monohydric alcohols, phenols, water, mineral acids, ketones, esters, ethers, and nitriles.

EP 0 236 257 teaches a method for the bulk polymerization of 1,3-butadiene into cis-1,4-polybutadiene by using a nickel-based catalyst system. The method includes very rapid polymerization of 1,3-butadiene to achieve a conversion of at least 60% in a short period of time. The molecular weight of the resulting cis-1,4-polybutadiene is reduced by employing a molecular weight regulator such as 1-butene. Actual practice of the invention, as shown in the examples, shows that the polymerization takes place at a relatively high temperature (e.g., 50° C.) to give cis-1,4-polybutadiene having a relatively high Mooney viscosity ($ML_{1+4}$@100° C.) (e.g., 82) and relatively high molecular weight distribution (e.g., greater than 2.9).

SUMMARY OF THE INVENTION

One or more embodiments of the present invention provide a process for preparing a polydiene, the process comprising the step of polymerizing conjugated diene monomer with a nickel-based catalyst system, where said step of polymerizing takes place within a polymerization mixture that includes less than 20% by weight of organic solvent based on the total weight of the polymerization mixture, where the temperature of the polymerization mixture is maintained below 34° C. during said step of polymerizing, and where the conversion of the conjugated diene monomer is maintained below 30%.

DETAILED DESCRIPTION OF ILLUSTRATIVE EMBODIMENTS

Embodiments of this invention are based, at least in part, on the discovery of a process for producing high cis-1,4-polydienes by bulk polymerization of conjugated dienes to low conversion with a nickel-based catalyst system at low temperature. While the prior art contemplates bulk polymerization of conjugated diene into high cis-1,4-polydienes using a nickel-based catalyst system, it has now been observed that the molecular weight distribution and gel content of the resulting high cis-1,4-polybutadienes is unexpectedly reduced by the practice of the present invention. Furthermore, practice of the present invention has unexpectedly lead to less reactor fouling. Advantageously, by practice of the present invention, desirable polymers can be obtained in the absence of a molecular weight regulator such as butene.

Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

In general, the nickel-based catalyst system employed in practicing the present invention may include the combination of or reaction product of ingredients including (a) a nickel-containing compound, (b) an alkylating agent, and (c) a fluorine source. In certain embodiments, these catalyst compositions are devoid or substantially devoid of other constituents such as Lewis bases or Lewis acids.

As mentioned above, the catalyst system employed in the present invention include a nickel-containing compound. Various nickel-containing compounds or mixtures thereof can be employed. In one or more embodiments, these nickel-containing compounds may be soluble in hydrocarbon solvents such as aromatic hydrocarbons, aliphatic hydrocarbons, or cycloaliphatic hydrocarbons. In other embodiments, hydrocarbon-insoluble nickel-containing compounds, which can be suspended in the polymerization medium to form catalytically active species, may also be useful.

The nickel atom in the nickel-containing compounds can be in various oxidation states including but not limited to the 0, +2, +3, and +4 oxidation states. Suitable nickel-containing compounds include, but are not limited to, nickel carboxylates, nickel carboxylate borates, nickel organophosphates, nickel organophosphonates, nickel organophosphinates, nickel carbamates, nickel dithiocarbamates, nickel xanthates, nickel β-diketonates, nickel alkoxides or aryloxides, nickel halides, nickel pseudo-halides, nickel oxyhalides, and organonickel compounds.

Suitable nickel carboxylates include nickel formate, nickel acetate, nickel acrylate, nickel methacrylate, nickel valerate, nickel gluconate, nickel citrate, nickel fumarate, nickel lactate, nickel maleate, nickel oxalate, nickel 2-ethylhexanoate, nickel neodecanoate, nickel naphthenate, nickel stearate, nickel oleate, nickel benzoate, and nickel picolinate.

Suitable nickel carboxylate borates include compounds defined by the formulae $(RCOONiO)_3B$ or $(RCOONiO)_2B(OR)$, where each R, which may be the same or different, is a hydrogen atom or a mono-valent organic group. In one embodiment, each R may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. Nickel carboxylate borate may include those disclosed in U.S. Pat. No. 4,522,988, which is incorporated herein by reference. Specific examples of nickel carboxylate borate include nickel(II) neodecanoate borate, nickel(II) hexanoate borate, nickel(II) naphthenate borate, nickel(II) stearate borate, nickel(II) octoate borate, nickel(II) 2-ethylhexanoate borate, and mixtures thereof.

Suitable nickel organophosphates include nickel dibutyl phosphate, nickel dipentyl phosphate, nickel dihexyl phosphate, nickel diheptyl phosphate, nickel dioctyl phosphate, nickel bis(1-methylheptyl)phosphate, nickel bis(2-ethylhexyl)phosphate, nickel didecyl phosphate, nickel didodecyl phosphate, nickel dioctadecyl phosphate, nickel dioleyl phosphate, nickel diphenyl phosphate, nickel bis(p-nonylphenyl) phosphate, nickel butyl (2-ethylhexyl)phosphate, nickel (1-methylheptyl)(2-ethylhexyl)phosphate, and nickel (2-ethylhexyl)(p-nonylphenyl)phosphate.

Suitable nickel organophosphonates include nickel butyl phosphonate, nickel pentyl phosphonate, nickel hexyl phosphonate, nickel heptyl phosphonate, nickel octyl phosphonate, nickel (1-methylheptyl)phosphonate, nickel (2-ethylhexyl)phosphonate, nickel decyl phosphonate, nickel dodecyl phosphonate, nickel octadecyl phosphonate, nickel oleyl phosphonate, nickel phenyl phosphonate, nickel (p-nonylphenyl)phosphonate, nickel butyl butylphosphonate, nickel pentyl pentylphosphonate, nickel hexyl hexylphosphonate, nickel heptyl heptylphosphonate, nickel octyl octylphosphonate, nickel (1-methylheptyl)(1-methylheptyl) phosphonate, nickel (2-ethylhexyl)(2-ethylhexyl)phosphonate, nickel decyl decylphosphonate, nickel dodecyl dodecylphosphonate, nickel octadecyl octadecylphosphonate, nickel oleyl oleylphosphonate, nickel phenyl phenylphosphonate, nickel (p-nonylphenyl)(p-nonylphenyl)phosphonate, nickel butyl (2-ethylhexyl)phosphonate, nickel (2-ethylhexyl)butylphosphonate, nickel (1-methylheptyl)(2-ethylhexyl)phosphonate, nickel (2-ethylhexyl)(1-methylheptyl)phosphonate, nickel (2-ethylhexyl)(p-nonylphenyl)phosphonate, and nickel (p-nonylphenyl)(2-ethylhexyl)phosphonate.

Suitable nickel organophosphinates include nickel butylphosphinate, nickel pentylphosphinate, nickel hexylphosphinate, nickel heptylphosphinate, nickel octylphosphinate, nickel (1-methylheptyl)phosphinate, nickel (2-ethylhexyl)phosphinate, nickel decylphosphinate, nickel dodecylphosphinate, nickel octadecylphosphinate, nickel oleylphosphinate, nickel phenylphosphinate, nickel (p-nonylphenyl)phosphinate, nickel dibutylphosphinate, nickel dipentylphosphinate, nickel dihexylphosphinate, nickel diheptylphosphinate, nickel dioctylphosphinate, nickel bis(1-methylheptyl)phosphinate, nickel bis(2-ethylhexyl)phosphinate, nickel didecylphosphinate, nickel didodecylphosphinate, nickel dioctadecylphosphinate, nickel dioleylphosphinate, nickel diphenylphosphinate, nickel bis(p-nonylphenyl)phosphinate, nickel butyl(2-ethylhexyl) phosphinate, nickel (1-methylheptyl)(2-ethylhexyl)phosphinate, and nickel (2-ethylhexyl)(p-nonylphenyl)phosphinate.

Suitable nickel carbamates include nickel dimethylcarbamate, nickel diethylcarbamate, nickel diisopropylcarbamate, nickel dibutylcarbamate, and nickel dibenzylcarbamate.

Suitable nickel dithiocarbamates include nickel dimethyldithiocarbamate, nickel diethyldithiocarbamate, nickel diisopropyldithiocarbamate, nickel dibutyldithiocarbamate, and nickel dibenzyldithiocarbamate.

Suitable nickel xanthates include nickel methylxanthate, nickel ethylxanthate, nickel isopropylxanthate, nickel butylxanthate, and nickel benzylxanthate.

Suitable nickel β-diketonates include nickel acetylacetonate, nickel trifluoroacetylacetonate, nickel hexafluoroacetylacetonate, nickel benzoylacetonate, and nickel 2,2,6,6-tetramethyl-3,5-heptanedionate.

Suitable nickel alkoxides or aryloxides include nickel methoxide, nickel ethoxide, nickel isopropoxide, nickel 2-ethylhexoxide, nickel phenoxide, nickel nonylphenoxide, and nickel naphthoxide.

Suitable nickel halides include nickel fluoride, nickel chloride, nickel bromide, and nickel iodide; suitable nickel pseudo-halides include nickel cyanide, nickel cyanate, nickel thiocyanate, nickel azide, and nickel ferrocyanide; and suitable nickel oxyhalides include nickel oxyfluoride, nickel oxychloride, and nickel oxybromide. In certain embodiments, a Lewis base such as tetrahydrofuran or an alcohol may be used as an aid for solubilizing these classes of nickel-containing compounds in inert organic solvents. Where nickel fluoride, nickel oxyfluoride, or other nickel-containing compounds containing a fluorine atom are employed, the nickel-containing compounds may also serve as part of the fluorine source in the above-mentioned catalyst system.

The term organonickel compound may refer to any nickel compound containing at least one nickel-carbon bond. Suitable organonickel compounds include bis(cyclopentadienyl) nickel (also called nickelocene), bis(pentamethylcyclopentadienyl)nickel (also called decamethylnickelocene), bis (tetramethylcyclopentadienyl)nickel, bis (ethylcyclopentadienyl)nickel, bis(isopropylcyclopentadienyl)nickel, bis(pentadienyl)nickel, bis(2,4-dimethylpentadienyl)nickel, (cyclopentadienyl)(pentadienyl)nickel, bis(1,5-cyclooctadiene)nickel, bis(allyl)nickel, bis(methallyl)nickel, and bis(crotyl)nickel.

As mentioned above, the nickel-based catalyst system employed in the present invention can include an alkylating agent. In one or more embodiments, alkylating agents, which may also be referred to as hydrocarbylating agents, include organometallic compounds that can transfer one or more hydrocarbyl groups to another metal. Typically, these agents include organometallic compounds of electropositive metals such as Groups 1, 2, and 3 metals (Groups IA, IIA, and IIIA metals). Alkylating agents useful in the present invention include, but are not limited to, organoaluminum and organomagnesium compounds. As used herein, the term organoaluminum compound refers to any aluminum compound containing at least one aluminum-carbon bond. In one or more embodiments, organoaluminum compounds that are soluble in a hydrocarbon solvent can be employed. As used herein, the term organomagnesium compound refers to any magnesium compound that contains at least one magnesium-carbon bond. In one or more embodiments, organomagnesium compounds that are soluble in a hydrocarbon can be employed. As will be described in more detail below, several species of suitable alkylating agents can be in the form of a fluoride compound. Where the alkylating agent includes a fluorine atom, the alkylating agent may also serve as all or part of the fluorine source in the above-mentioned catalyst system.

In one or more embodiments, organoaluminum compounds that can be utilized include those represented by the general formula $AlR_nX_{3-n}$, where each R independently can be a monovalent organic group that is attached to the aluminum atom via a carbon atom, where each X independently can be a hydrogen atom, a halogen atom (e.g., a fluorine, chlorine, bromine, or iodine atom), a carboxylate group, an alkoxide group, or an aryloxide group, and where n can be an integer in the range of from 1 to 3. Where the organoaluminum compound includes a fluorine atom, the organoaluminum compound can serve as both the alkylating agent and at least a portion of the fluorine source in the catalyst system. In one or more embodiments, each R independently can be a hydrocarbyl group such as, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms.

Types of the organoaluminum compounds that are represented by the general formula $AlR_nX_{3-n}$ include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. In one embodiment, the alkylating agent can comprise trihydrocarbylaluminum, dihydrocarbylaluminum hydride, and/or hydrocarbylaluminum dihydride compounds.

Suitable trihydrocarbylaluminum compounds include, but are not limited to, trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Suitable dihydrocarbylaluminum hydride compounds include, but are not limited to, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include, but are not limited to, ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum halide compounds include, but are not limited to, diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, benzyl-n-octylaluminum chloride, diethylaluminum fluoride, di-n-propylaluminum fluoride, diisopropylaluminum fluoride, di-n-butylaluminum fluoride, diisobutylaluminum fluoride, di-n-octylaluminum fluoride, diphenylaluminum fluoride, di-p-tolylaluminum fluoride, dibenzylaluminum fluoride, phenylethylaluminum fluoride, phenyl-n-propylaluminum fluoride, phenylisopropylaluminum fluoride, phenyl-n-butylaluminum fluoride, phenylisobutylaluminum fluoride, phenyl-n-octylaluminum fluoride, p-tolylethylaluminum fluoride, p-tolyl-n-propylaluminum fluoride, p-tolylisopropylaluminum fluoride, p-tolyl-n-butylaluminum fluoride, p-tolylisobutylaluminum fluoride, p-tolyl-n-octylaluminum fluoride, benzylethylaluminum fluoride, benzyl-n-propylaluminum fluoride, benzylisopropylaluminum fluoride, benzyl-n-butylaluminum fluoride, benzylisobutylaluminum fluoride, and benzyl-n-octylaluminum fluoride.

Suitable hydrocarbylaluminum dihalide compounds include, but are not limited to, ethylaluminum dichloride, n-propylaluminum dichloride, isopropylaluminum dichloride, n-butylaluminum dichloride, isobutylaluminum dichloride, n-octylaluminum dichloride, ethylaluminum difluoride, n-propylaluminum difluoride, isopropylaluminum difluoride, n-butylaluminum difluoride, isobutylaluminum difluoride, and n-octylaluminum difluoride.

Other organoaluminum compounds useful as alkylating agents that may be represented by the general formula $AlR_nX_{3-n}$ include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Another class of organoaluminum compounds suitable for use as an alkylating agent in the present invention is aluminoxanes. Aluminoxanes can comprise oligomeric linear aluminoxanes, which can be represented by the general formula:

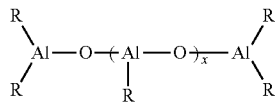

and oligomeric cyclic aluminoxanes, which can be represented by the general formula:

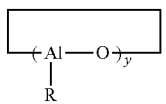

where x can be an integer in the range of from 1 to about 100, or about 10 to about 50; y can be an integer in the range of from 2 to about 100, or about 3 to about 20; and where each R independently can be a monovalent organic group that is attached to the aluminum atom via a carbon atom. In one embodiment, each R independently can be a hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalyst systems utilizing aluminoxanes.

Aluminoxanes can be prepared by reacting trihydrocarbylaluminum compounds with water. This reaction can be preformed according to known methods, such as, for example, (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, or (3) a method in which the trihydrocarbylaluminum compound is reacted with water in the presence of the monomer or monomer solution that is to be polymerized.

Suitable aluminoxane compounds include, but are not limited to, methylaluminoxane ("MAO"), modified methylaluminoxane ("MMAO"), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, and 2,6-dimethylphenylaluminoxane. Modified methylaluminoxane can be formed by substituting about 20 to 80 percent of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one embodiment, methylaluminoxane and at least one other organoaluminum compound (e.g., $AlR_nX_{3-n}$), such as diisobutyl aluminum hydride, can be employed in combination. U.S. Publication No. 2008/0182954, which is incorporated herein by reference in its entirety, provides other examples where aluminoxanes and organoaluminum compounds can be employed in combination.

As mentioned above, alkylating agents useful in the present invention can comprise organomagnesium compounds. In one or more embodiments, organomagnesium compounds that can be utilized include those represented by the general formula $MgR_2$, where each R independently can be a monovalent organic group that is attached to the magnesium atom via a carbon atom. In one or more embodiments, each R independently can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, silicon, sulfur, and phosphorus atoms.

Suitable organomagnesium compounds that may be represented by the general formula $MgR_2$ include, but are not limited to, diethylmagnesium, di-n-propylmagnesium, diisopropylmagnesium, dibutylmagnesium, dihexylmagnesium, diphenylmagnesium, and dibenzylmagnesium.

Another class of organomagnesium compounds that can be utilized as an alkylating agent may be represented by the general formula RMgX, where R can be a monovalent organic group that is attached to the magnesium atom via a carbon atom, and X can be a hydrogen atom, a halogen atom (e.g., a fluorine, chlorine, bromine, or iodine atom), a carboxylate group, an alkoxide group, or an aryloxide group. Where the organomagnesium compound includes a fluorine atom, the organomagnesium compound can serve as both the alkylating agent and at least a portion of the fluorine source in the catalyst system. In one or more embodiments, R can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. In one embodiment, X can be a carboxylate group, an alkoxide group, or an aryloxide group, with each group containing in the range of from 1 to about 20 carbon atoms.

Types of organomagnesium compounds that may be represented by the general formula RMgX include, but are not limited to, hydrocarbylmagnesium hydride, hydrocarbylmagnesium halide, hydrocarbylmagnesium carboxylate, hydrocarbylmagnesium alkoxide, and hydrocarbylmagnesium aryloxide.

Suitable organomagnesium compounds that may be represented by the general formula RMgX include, but are not limited to, methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium fluoride, ethylmagnesium fluoride, butylmagnesium fluoride, hexylmagnesium fluoride, phenylmagnesium fluoride, benzylmagnesium fluoride, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, and benzylmagnesium phenoxide.

As mentioned above, the nickel-based catalyst system employed in the present invention can include a fluorine source. As used herein, the term fluorine source refers to any substance including at least one fluorine atom. In one or more embodiments, at least a portion of the fluorine source can be provided by either of the above-described nickel-containing compound and/or the above-described alkylating agent, when those compounds contain at least one fluorine atom. In other words, the nickel-containing compound can serve as both the nickel-containing compound and at least a portion of the fluorine source. Similarly, the alkylating agent can serve as both the alkylating agent and at least a portion of the fluorine source.

In one or more embodiments, at least a portion of the fluorine source can be present in the catalyst system in the form of a separate and distinct fluorine-containing compound. Fluorine-containing compounds may include various compounds, or mixtures thereof, that contain one or more labile fluorine atoms. In one or more embodiments, the fluorine-containing compound may be soluble in a hydrocarbon solvent. In other embodiments, hydrocarbon-insoluble fluorine-containing compound may be useful.

Types of fluorine-containing compounds include, but are not limited to, elemental fluorine, halogen fluorides, hydrogen fluoride, organic fluorides, inorganic fluorides, metallic fluorides, organometallic fluorides, and mixtures thereof. In one or more embodiments, complexes of the fluorine-containing compounds with a Lewis base such as ethers, alcohols, water, aldehydes, ketones, esters, nitriles, or mixtures thereof may be employed. Specific examples of these complexes include the complexes of boron trifluoride or hydrogen fluoride with a Lewis base such as hexanol.

Halogen fluorides may include iodine monofluoride, iodine trifluoride, and iodine pentafluoride.

Organic fluorides may include t-butyl fluoride, allyl fluoride, benzyl fluoride, fluoro-di-phenylmethane, triphenylmethyl fluoride, benzylidene fluoride, methyltrifluorosilane, phenyltrifluorosilane, dimethyldifluorosilane, diphenyldifluorosilane, trimethylfluorosilane, benzoyl fluoride, propionyl fluoride, and methyl fluoroformate.

Inorganic fluorides may include phosphorus trifluoride, phosphorus pentafluoride, phosphorus oxyfluoride, boron trifluoride, silicon tetrafluoride, arsenic trifluoride, selenium tetrafluoride, and tellurium tetrafluoride.

Metallic fluorides may include tin tetrafluoride, aluminum trifluoride, antimony trifluoride, antimony pentafluoride, gallium trifluoride, indium trifluoride, titanium tetrafluoride, and zinc difluoride.

Organometallic fluorides may include dimethylaluminum fluoride, diethylaluminum fluoride, methylaluminum difluoride, ethylaluminum difluoride, methylaluminum sesquifluoride, ethylaluminum sesquifluoride, isobutylaluminum sesquifluoride, methylmagnesium fluoride, ethylmagnesium fluoride, butylmagnesium fluoride, phenylmagnesium fluoride, benzylmagnesium fluoride, trimethyltin fluoride, triethyltin fluoride, di-t-butyltin difluoride, dibutyltin difluoride, and tributyltin fluoride.

An active catalyst is formed when the nickel-containing compound, the alkylating agent, and the fluorine source are introduced or brought together. The resulting active catalyst is capable of polymerizing conjugated diene monomer to form a high cis-1,4-polydiene under bulk polymerization conditions.

Although one or more active catalyst species are believed to result from the combination of the catalyst ingredients, the degree of interaction or reaction between the various catalyst ingredients or components is not known with any great degree of certainty. Therefore, the term active catalyst or catalyst composition has been employed to encompass a simple mixture of the ingredients, a complex of the various ingredients that is caused by physical or chemical forces of attraction, a chemical reaction product of the ingredients, or a combination of the foregoing ingredients, so long as this mixture, complex, reaction product, or combination is capable of polymerizing monomer as discussed above.

The foregoing nickel-based catalyst composition may have high catalytic activity for polymerizing conjugated dienes into cis-1,4-polydienes over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the alkylating agent to the nickel-containing compound (alkylating agent/Ni) can be varied from about 10:1 to about 50:1, in other embodiments from about 20:1 to about 40:1, and in other embodiments from about 25:1 to about 35:1. In one or more embodiments, the molar ratio of the alkylating agent to the nickel-containing compound (alkylating agent/Ni) is less than 35:1, in other embodiments less than 30:1, in other embodiments less than 27:1, and in other embodiments less than 25:1.

In one or more embodiments, the molar ratio of the fluorine source to the nickel-containing compound is best described in terms of the ratio of the mole of fluorine atoms in the fluorine source to the mole of nickel atoms in the nickel-containing compound (fluorine/Ni). In one or more embodiments, the fluorine/Ni molar ratio can be varied from about 70:1 to about 130:1, in other embodiments from about 80:1 to about 120:1, and in other embodiments from about 90:1 to about 108:1.

In one or more embodiments, the molar ratio of the alkylating agent to the fluorine source, which may be described in terms of the ratio of the mole of alkylating agent to the mole of fluorine atoms in the fluorine source (alkylating/fluorine), can be varied from 0.05:1 to 1.5:1, in other embodiments from 0.1:1 to 0.9:1, and in other embodiments from 0.2:1 to 0.5:1.

The active catalyst can be formed by various methods.

In one or more embodiments, the active catalyst may be preformed. That is, the catalyst ingredients are pre-mixed outside the polymerization system either in the absence of any monomer or in the presence of a small amount of at least one conjugated diene monomer at an appropriate temperature, which may be from about −20° C. to about 80° C. The resulting catalyst composition may be aged, if desired, prior to being added to the monomer that is to be polymerized. As used herein, reference to a small amount of monomer refers to a catalyst loading of greater than 2 mmol, in other embodiments greater than 3 mmol, and in other embodiments greater than 4 mmol of nickel-containing compound per 100 g of monomer during the catalyst formation.

In other embodiments, the active catalyst may be formed in situ by adding the catalyst ingredients, in either a stepwise or simultaneous manner, to the monomer to be polymerized. In one embodiment, the alkylating agent can be added first, followed by the nickel-containing compound, and then followed by the fluorine source. In one or more embodiments, two of the catalyst ingredients can be pre-combined prior to being added to the monomer. For example, the nickel-containing compound and the alkylating agent can be pre-combined and added as a single stream to the monomer. Alternatively, the fluorine source and the alkylating agent can be pre-combined and added as a single stream to the monomer. An in situ formation of the catalyst may be characterized by a catalyst loading of less than 2 mmol, in other embodiments less than 1 mmol, in other embodiments less than 0.2 mmol, in other embodiments less than 0.1 mmol, in other embodiments less than 0.05 mmol, and in other embodiments less than or equal to 0.006 mmol of nickel-containing compound per 100 g of monomer during the catalyst formation.

In one or more embodiments, the polymerization of conjugated diene monomer with the nickel-based catalyst system may be conducted in the presence of an optional modulating Lewis base. As used herein, the term modulating Lewis base refers to any Lewis base that, when present in the polymerization mixture, can modulate the polymerization to allow it to proceed at a reduced polymerization rate. In one or more embodiments, a modulating Lewis base includes a Lewis base that does not include an acidic proton.

In one or more embodiments, the optional modulating Lewis base is introduced directly and individually to the monomer to be polymerized or the polymerization mixture. In other words, prior to being introduced to the polymerization system, the modulating Lewis base is not complexed with the various catalyst ingredients employed. In these or other embodiments, alkylation of the nickel-containing compound, which is believed to take place when the nickel-containing compound and the alkylating agent are brought into contact, takes place in the substantial absence of the modulating Lewis base. In particular embodiments, the formation of the active catalyst takes place in the substantial absence of the modulating Lewis base.

As used herein, reference to a substantial absence refers to that amount of the modulating Lewis base or less that will not deleteriously impact the formation or performance of the catalyst. In one or more embodiments, the active catalyst is formed in the presence of less than 10 mole, in other embodiments in the presence of less than 2 mole, and in other embodiments in the presence of less than 1 mole of the modulating Lewis base per mole of nickel metal in the nickel-containing compound. In other embodiments, the catalyst is formed in the essential absence of the modulating Lewis base, which refers to a de minimis amount or less of the modulating Lewis base. In particular embodiments, the active catalyst is formed in the complete absence of the modulating Lewis base.

In one or more embodiments, the optional modulating Lewis base may be present in the monomer prior to the introduction of the active catalyst, which would include a preformed active catalyst. For example, the modulating Lewis base is introduced directly and individually to the monomer to be polymerized, and then the preformed active catalyst is introduced to the mixture of the monomer and modulating Lewis base. In these embodiments, the introduction of the modulating Lewis base to the monomer to be polymerized forms a monomer/modulating Lewis base blend that is free of active catalyst prior to the introduction of the active catalyst.

In other embodiments, the preformed active catalyst and the optional modulating Lewis base may be added simultaneously, yet separately and individually, to the monomer to be polymerized.

In other embodiments, the optional modulating Lewis base is introduced to the monomer that contains the active catalyst. As described above, the active catalyst may be formed by a preforming procedure or in situ. As those skilled in the art appreciate, where the active catalyst is present in the monomer prior to the introduction of the modulating Lewis base, the active catalyst may be in the form of propagating oligomeric species at the time the modulating Lewis base is introduced. In this regard, those skilled in the art will appreciate that reference to active catalyst may refer to low molecular weight living or pseudo-living oligomers.

In one or more embodiments, the optional modulating Lewis base is introduced to the monomer after introduction of the catalyst ingredients for forming the active catalyst or introduction of the preformed active catalyst itself. In one or more embodiments, the optional modulating Lewis base is added before 5%, in other embodiments before 3%, in other embodiments before 1%, and in other embodiments before 0.5% of the monomer is polymerized.

Exemplary modulating Lewis bases include, but are not limited to, dihydrocarbyl ethers and amines.

In one or more embodiments, suitable dihydrocarbyl ethers include those compounds represented by the formula R—O—R, where each R is independently a hydrocarbyl group or substituted hydrocarbyl group. The hydrocarbyl group may contain heteroatoms such as, but not limited to, nitrogen, oxygen, silicon, tin, sulfur, boron, and phosphorous atoms. Suitable types of hydrocarbyl groups or substituted hydrocarbyl groups include, but are not limited to, alkyl, cycloalkyl, substituted cycloalkyl, alkenyl, cycloalkenyl, aryl, substituted aryl groups, and heterocyclic groups.

Exemplary alkyl groups include methyl, ethyl, n-propyl, isopropyl, n-butyl, isobutyl, t-butyl, n-pentyl, isopentyl, neopentyl, n-hexyl, n-heptyl, 2-ethylhexyl, n-octyl, n-nonyl, and n-decyl groups.

Exemplary cycloalkyl groups include cyclopropyl, cyclobutyl, cyclopentyl, cyclohexyl, 2-methylcyclohexyl, 2-t-butylcyclohexyl, and 4-t-butylcyclohexyl groups.

Exemplary aryl groups include phenyl, substituted phenyl, biphenyl, substituted biphenyl, bicyclic aryl, substituted bicyclic aryl, polycyclic aryl, and substituted polycyclic aryl groups. Substituted aryl groups include those where a hydrogen atom is replaced by a mono-valent organic group such as a hydrocarbyl group.

Exemplary substituted phenyl groups include 2-methylphenyl, 3-methylphenyl, 4-methylphenyl, 2,3-dimethylphenyl, 3,4-dimethylphenyl, 2,5-dimethylphenyl, 2,6-dimethylphenyl, and 2,4,6-trimethylphenyl (also called mesityl) groups.

Exemplary bicyclic or polycyclic aryl groups include 1-naphthyl, 2-napthyl, 9-anthryl, 9-phenanthryl, 2-benzo[b]thienyl, 3-benzo[b]thienyl, 2-naphtho[2,3-b]thienyl, 2-thianthrenyl, 1-isobenzofuranyl, 2-xanthenyl, 2-phenoxathiinyl, 2-indolizinyl, N-methyl-2-indolyl, N-methyl-indazol-3-yl, N-methyl-8-purinyl, 3-isoquinolyl, 2-quinolyl, 3-cinnolinyl, 2-pteridinyl, N-methyl-2-carbazolyl, N-methyl-β-carbolin-3-yl, 3-phenanthridinyl, 2-acridinyl, 1-phthalazinyl, 1,8-naphthyridin-2-yl, 2-quinoxalinyl, 2-quinazolinyl, 1,7-phenanthrolin-3-yl, 1-phenazinyl, N-methyl-2-phenothiazinyl, 2-phenarsazinyl, and N-methyl-2-phenoxazinyl groups.

Exemplary heterocyclic groups include 2-thienyl, 3-thienyl, 2-furyl, 3-furyl, N-methyl-2-pyrrolyl, N-methyl-3-pyrrolyl, N-methyl-2-imidazolyl, 1-pyrazolyl, N-methyl-3-pyrazolyl, N-methyl-4-pyrazolyl, 2-pyridyl, 3-pyridyl, 4-pyridyl, pyrazinyl, 2-pyrimidinyl, 3-pyridazinyl, 3-isothiazolyl, 3-isoxazolyl, 3-furazanyl, 2-triazinyl, morpholinyl, thiomorpholinyl, piperidinyl, piperazinyl, pyrrolidinyl, pyrrolinyl, imidazolidinyl, and imidazolinyl groups.

Suitable types of dihydrocarbyl ethers include, but are not limited to, dialkyl ethers, dicycloalkyl ethers, diaryl ethers, and mixed dihydrocarbyl ethers.

Specific examples of dialkyl ethers include dimethyl ether, diethyl ether, di-n-propyl ether, diisopropyl ether, di-n-butyl ether, diisobutyl ether, di-t-butyl ether, di-n-pentyl ether, diisopentyl ether, dineopentyl ether, di-n-hexyl ether, di-n-heptyl ether, di-2-ethylhexyl ether, di-n-octyl ether, di-n-nonyl ether, di-n-decyl ether, and dibenzyl ether.

Specific examples of dicycloalkyl ethers include dicyclopropyl ether, dicyclobutyl ether, dicyclopentyl ether, dicyclohexyl ether, di-2-methylcyclohexyl ether, and di-2-t-butylcyclohexyl ether.

Specific examples of diaryl ethers include diphenyl ether, di-o-tolyl ether, di-m-tolyl ether, and di-p-tolyl ether.

Specific examples of mixed dihydrocarbyl ethers include n-butyl methyl ether, isobutyl methyl ether, sec-butyl methyl ether, t-butyl methyl ether, n-butyl ethyl ether, isobutyl ethyl ether, sec-butyl ethyl ether, t-butyl ethyl ether, t-amyl methyl ether, t-amyl ethyl ether, phenyl methyl ether (also called anisole), phenyl ethyl ether, phenyl n-propyl ether, phenyl isopropyl ether, phenyl n-butyl ether, phenyl isobutyl ether, phenyl n-octyl ether, p-tolyl ethyl ether, p-tolyl n-propyl ether, p-tolyl isopropyl ether, p-tolyl n-butyl ether, p-tolyl isobutyl ether, p-tolyl t-butyl ether, p-tolyl n-octyl ether, benzyl n-ethyl ether, benzyl n-propyl ether, benzyl isopropyl ether, benzyl n-butyl ether, benzyl isobutyl ether, benzyl t-butyl ether, and benzyl n-octyl ether.

In one or more embodiments, one or both of the hydrocarbyl groups (R) in the dihydrocarbyl ether may contain one or more additional ether linkages (i.e., C—O—C). These ether compounds may be referred to as polyethers. Specific examples of polyethers include glyme ethers such as ethylene glycol dimethyl ether (also called monoglyme), ethylene glycol diethyl ether, diethylene glycol dimethyl ether (also called diglyme), diethylene glycol diethyl ether, diethylene glycol di-n-butyl ether, triethylene glycol dimethyl ether (also called triglyme), triethylene glycol diethyl ether, tetraethylene glycol dimethyl ether (also called tetraglyme), and tetraethylene glycol diethyl ether.

In one or more embodiments, suitable amines include those compounds represented by the formula $NR_3$, where each R, which may be the same or different, is a hydrocarbyl group or substituted hydrocarbyl group, or where two or more R groups combine to form a divalent or trivalent organic group. The hydrocarbyl group may contain heteroatoms such as, but not limited to, nitrogen, oxygen, silicon, tin, sulfur, boron, and phosphorous atoms. Suitable types of hydrocarbyl groups or substituted hydrocarbyl groups include, but are not limited to, alkyl, cycloalkyl, substituted cycloalkyl, alkenyl, cycloalkenyl, aryl, substituted aryl groups, and heterocyclic groups. Specific examples of hydrocarbyl groups include those provided above for the dihydrocarbyl ether compounds. In certain embodiments, suitable amines include those compounds where the nitrogen atom of the amine has three bonds to carbon atoms. Specifically contemplated are those amines where the nitrogen is singly bonded to three carbon atoms (e.g. trihydrocarbylamines). Also specifically contemplated are those amines where the nitrogen is singly bonded to a carbon atom and doubly bonded to a second carbon atom (e.g. aromatic amines such as pyridine).

In one or more embodiments, the amines are tertiary amines. In one or more embodiments, the tertiary amines may include one or more acyclic substituents. In other embodiments, the tertiary amines may include one or more cyclic, non-aromatic substituents. In yet other embodiments, the tertiary amines may include one or more aromatic substituents. In particular embodiments, the tertiary amines are devoid of aromatic substituents bonded directly to the nitrogen atom of the tertiary amine. In one or more embodiments, the tertiary amines are cyclic non-aromatic amines, where the nitrogen atom of the tertiary amine is a member of a non-aromatic ring. In other embodiments, the tertiary amines are aromatic amines, where the nitrogen atom of the tertiary amine is a member of an aromatic ring. In one or more embodiments, the tertiary amines are monodentate compounds, which refers to the presence of only one lone pair of electrons that are capable of binding or coordinating to the nickel metal of the nickel-containing compound.

Specific examples of tertiary amines that include acyclic substituents include trimethylamine, triethylamine, tri-n-propylamine, triisopropylamine, tri-n-butylamine, triisobutylamine, tri-sec-butylamine, tripentylamine, triisopentylamine, tri-n-hexylamine, trioctylamine, trioctylamine, tricetylamine, tridodecylamine, triheptylamine, tri-iso-heptylamine, trinonylamine, N-methyl-N,N-dioctylamine, N,N-dimethyl-N-ethylamine, N-methyl-N-ethyl-N-propylamine, N,N-dimethyl-N-hexylamine, tri-isoamylamine, triamylamine.

Specific examples of tertiary amines that include cyclic, non-aromatic substituents include tricyclopentylamine, tricyclohexylamine, and tricyclooctylamine.

Specific examples of tertiary amines that include an aromatic substituent include N,N-dimethyl-1-naphthylamine, N,N-dimethylaniline, N,N-diethylaniline, N,N-dimethylbenzylamine, triphenyl amine, and tribenzylamine.

Specific examples of cyclic, non-aromatic amines include N-methylpyrrolidine, 1,2-dimethylpyrrolidine, 1,3-dimethylpyrrolidine, 1,2,5-trimethylpyrrolidine, 2-methyl-2-pyrazoline, 1-methyl-2H-pyrrole, 2H-pyrrole, 1-methylpyrrole, 2,4-dimethyl-1-methylpyrrole, 2,5-dimethyl-1-methylpyrrole, N-methylpyrrole, 1,2,5-trimethylpyrrole, 3-pyrroline, 2-pyrroline, 2-methyl-1-pyrroline, 2-imidazoline, N-ethylpiperidine, 1-ethylpiperidine, N-cyclohexyl-N,N-dimethylamine, quinuclidine, 3-(biphenyl-4-yl)quinuclidine, and 1-methyl-carbozole.

Specific examples of aromatic amines include pyridine, methylpyridine, 2,6-dimethylpyridine, 2-methylpyridine, 3-methylpyridine, 4-methylpyridine, dimethylpyridine, trimethylpyridine, ethylpyridine, 2-ethylpyridine, 3-ethylpyridine, 4-ethylpyridine, 2,4-diethylpyridine, 2,6-diethylpyridine, 3,4-diethylpyridine, 2,3-, imethylpyridine, 2,4-dimethylpyridine, 2,5-dimethylpyridine, 3,4-dimethylpyridine, 3,5-dimethylpyridine, triethylpyridine, 1,4,5-triethylpyridine, 2,4,5-triethylpyridine, 2,3,4-trimethylpyridine, 2,3,5-trimethylpyridine, 2,3,6-trimethylpyridine, 2,4,6-trimethylpyridine, propylpyridine, 3-methyl-4-propylpyridine, butylpyridine, 4-(1-butylpentyl)pyridine, 4-tert-butylpyridine, phenylpyridine, 3-methyl-2-phenylpyridine, diphenylpyridine, 2-phenylpyridine, benzylpyridine, 4-pyrrolidinopyridine, 1-methyl-4-phenylpyridine, 2-(1-ethylpropyl)pyridine, 2,6-dimethyl-4-ethylpyridine, 3-ethyl-4-methylpyridine, 3,5-dimethyl-2-ethylpyridine, 2,3,4,5-tetramethylpyridine, pyrazine, pyridazine, pyrimidine, 4-methylpyrimidine, 1,2,3-triazole, 1,3,5-triazine, quinoline, 2-ethylquinoline, 3-ethylquinoline, 4-ethylquinoline, 2-methylquinoline, 3-methylquinoline, 4-methylquinoline, 5-methylquinoline, 6-methylquinoline, 8-methylquinoline, 2,4-dimethylquinoline, 4,6-dimethylquinoline, 4,7-dimethylquinoline, 5,8-dimethylquinoline, 6,8-dimethylquinoline, 2,4,7-trimethylquinoline, isoquinoline, 4-ethyl-isoquinoline, 1-ethylisoquinoline, 3-ethylisoquinoline, 4-methyl-2-phenylimidazole, 2-(4-methylphenyl)indolizine, indolizine, quinoxaline, 2-amino-8-methyl-quinoxaline, 1-methylindole, 1,8-naphthyridine, cinnoline, quinazoline, pteridine, acridine, phenazine, 1-methylpyrazole, 1,3-dimethylpyrazole, 1,3,4-trimethylpyrazole, 3,5-dimethyl-1-phenylpyrazole, and 3,4-dimethyl-1-phenylpyrazole.

In one or more embodiments, the amount of the optional modulating Lewis base introduced directly and individually to the monomer to be polymerized may depend upon the type of the modulating Lewis base employed. In one or more embodiments, where a dihydrocarbyl ether is employed as the optional modulating Lewis base, the amount of the dihydrocarbyl ether employed may be represented by the molar ratio of the dihydrocarbyl ether to the nickel-containing compound (ether/Ni). In one or more embodiments, the ether/Ni molar ratio is from about 10:1 to about 80:1, in other embodiments from about 20:1 to about 70:1, in other embodiments from about 30:1 to about 55:1, and in other embodiments from about 35:1 to about 45:1.

In one or more embodiments, where an amine is employed as the optional modulating Lewis base, the amount of the amine employed may be represented by the molar ratio of the amine to the nickel-containing compound (amine/Ni). In one or more embodiments, the amine/Ni molar ratio is from about 0.1:1 to about 2.0:1, in other embodiments from about 0.3:1 to about 1.6:1, in other embodiments from about 0.5:1 to about 1.4:1, and in other embodiments from about 0.7:1 to about 1.2:1.

In one or more embodiments, a solvent may be employed as a carrier to either dissolve or suspend the catalyst, catalyst ingredients, and/or the optional modulating Lewis base in order to facilitate the delivery of the same to the polymerization system. In other embodiments, monomer can be used as the carrier. In yet other embodiments, the catalyst ingredients or modulating Lewis base can be introduced in their neat state without any solvent.

In one or more embodiments, suitable solvents include those organic compounds that will not undergo polymerization or incorporation into propagating polymer chains during the polymerization of monomer in the presence of the catalyst. In one or more embodiments, these organic species are liquid at ambient temperature and pressure. In one or more embodiments, these organic solvents are inert to the catalyst. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, including hydrocarbon oils that are commonly used to oil-extend polymers. Examples of these oils include paraffinic oils, aromatic oils, naphthenic oils, vegetable oils other than castor oils, and low PCA oils including MES, TDAE, SRAE, heavy naphthenic oils. Since these hydrocarbons are non-volatile, they typically do not require separation and remain incorporated in the polymer.

The production of polymer according to this invention can be accomplished by polymerizing conjugated diene monomer in the presence of a catalytically effective amount of the active catalyst. The introduction of the catalyst, the conjugated diene monomer, the optional modulating Lewis base, and any solvent, if employed, forms a polymerization mixture in which a polymer is formed. The amount of the catalyst to be employed may depend on the interplay of various factors such as the type of catalyst employed, the purity of the ingredients, the polymerization temperature, the polymerization rate and conversion desired, the molecular weight desired, and many other factors. Accordingly, a specific catalyst amount cannot be definitively set forth except to say that catalytically effective amounts of the catalyst may be used.

In one or more embodiments, the amount of the nickel-containing compound used can be varied from about 0.001 to about 0.100 mmol, in other embodiments from about 0.005 to about 0.050 mmol, and in still other embodiments from about 0.010 to about 0.030 mmol per 100 gram of monomer.

In one or more embodiments, the polymerization of conjugated diene monomer according to this invention may be conducted in a bulk polymerization system that includes substantially no solvent or a minimal amount of solvent. Those skilled in the art will appreciate the benefits of bulk polymerization processes (i.e., processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In another embodiment, the polymerization mixture contains no solvents other than those that are inherent to the raw materials employed. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

The polymerization may be conducted in any conventional polymerization vessels known in the art. In one or more embodiments, the polymerization can be conducted in a conventional stirred-tank reactor, which may optionally be used in conjunction with other types of reactors, such as extruders or devolatilizers. Examples of useful bulk polymerization processes are disclosed in U.S. Pat. No. 7,351,776, which is incorporated herein by reference.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about $-10°$ C. to about $34°$ C., in other embodiments from about $0°$ C. to about $30°$ C., and in other embodiments from about $10°$ C. to about $25°$ C. In particular embodiments, the polymerization takes place at a peak polymerization temperature of less than $34°$ C., in other embodiments less than $32°$ C., in other embodiments less than $27°$ C., and in other embodiments less than $25°$ C.

In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, the polymerization conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

In one or more embodiments, the bulk polymerization process of this invention is maintained at a relatively low monomer conversion in order to avoid polymer gel formation. In one or more embodiments, the monomer conversion is maintained at less than 30%, in other embodiments less than 20%, in other embodiments less than 15%, and in other embodiments less than 12%. In one or more embodiments, the monomer concentration within the polymerization vessel is maintained at greater than 70% by weight, in other embodiments greater than 80% by weight, in other embodiments greater than 85% by weight, and in other embodiments greater than 88% by weight based on the total weight of the polymerization mixture within the polymerization vessel.

Once a desired monomer conversion has been achieved, a quenching agent can be added to the polymerization mixture in order to inactivate any reactive polymer chains and the catalyst or catalyst ingredients. The quenching agent may be a protic compound, which includes, but is not limited to, an alcohol, a carboxylic acid, an inorganic acid, water, or a mixture thereof. In particular embodiments, the quenching agent includes a polyhydroxy compound as disclosed in U.S. Pat. Publ. No. 2009/0043055, which is incorporated herein by reference. An antioxidant such as 2,6-di-t-butyl-4-methylphenol may be added along with, before, or after the addition of the quenching agent. The amount of the antioxidant employed may be in the range of about 0.2% to about 1% by weight of the polymer product. The quenching agent and the antioxidant may be added as neat materials or, if necessary, dissolved in a hydrocarbon solvent or conjugated diene monomer prior to being added to the polymerization mixture. Additionally, the polymer product can be oil extended by adding an oil to the polymer, which may be in the form of a polymer cement or polymer dissolved or suspended in monomer. Practice of the present invention does not limit the amount of oil that may be added, and therefore conventional amounts may be added (e.g., 5-50 phr). Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

Once the polymerization mixture has been quenched, the various constituents of the polymerization mixture may be recovered. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The polymer product may be recovered from the polymerization mixture by using techniques known in the art. In one or more embodiments, desolventization and drying techniques may be used. For instance, the polymer can be recovered by passing the polymerization mixture through a heated screw apparatus, such as a desolventizing extruder, in which the volatile substances are removed by evaporation at appropriate temperatures (e.g., about $100°$ C. to about $170°$ C.) and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. The polymer can also be recovered by directly drying the polymerization mixture on a drum dryer.

In one or more embodiments, the polymers prepared according to this invention may contain unsaturation. In these or other embodiments, the polymers are vulcanizable. In one or more embodiments, the polymers can have a glass transition temperature ($T_g$) that is less than 0° C., in other embodiments less than −20° C., and in other embodiments less than −30° C. In one embodiment, these polymers may exhibit a single glass transition temperature. In particular embodiments, the polymers may be hydrogenated or partially hydrogenated.

In one or more embodiments, the polymers of this invention may be cis-1,4-polydienes having a cis-1,4-linkage content that is greater than 97%, in other embodiments greater than 97.5%, in other embodiments greater than 98.0%, and in other embodiments greater than 98.5%, where the percentages are based upon the number of diene mer units adopting the cis-1,4-linkage versus the total number of diene mer units. Also, these polymers may have a 1,2-linkage content that is less than about 1.0%, in other embodiments less than 0.8%, in other embodiments less than 0.7%, and in other embodiments less than 0.6%, where the percentages are based upon the number of diene mer units adopting the 1,2-linkage versus the total number of diene mer units. The balance of the diene mer units may adopt the trans-1,4-linkage. The cis-1,4-, 1,2-, and trans-1,4-linkage contents can be determined by infrared spectroscopy.

In one or more embodiments, the number average molecular weight ($M_n$) of these polymers may be from about 1,000 to about 1,000,000, in other embodiments from about 5,000 to about 200,000, in other embodiments from about 25,000 to about 150,000, and in other embodiments from about 50,000 to about 120,000, as determined by using gel permeation chromatography (GPC) calibrated with polystyrene standards and Mark-Houwink constants for the polymer in question.

In one or more embodiments, the molecular weight distribution or polydispersity ($M_w/M_n$) of these polymers may be less than 3.0, in other embodiments less than 2.9, in other embodiments less than 2.6, in other embodiments less than 2.5, in other embodiments less than 2.3, in other embodiments less than 2.1, in other embodiments less than 2.0, and in other embodiments less than 1.9.

In one or more embodiments, the Mooney viscosity ($ML_{1+4}$@100° C.) of the polymers may be less than 60, in other embodiments less than 50, in other embodiments less than 40, and in other embodiments less than 25.

In one or more embodiments, the gel content of the polymers may be less than 20% by weight, in other embodiments less than 10% by weight, in other embodiments less than 7% by weight, in other embodiments less than 5% by weight, in other embodiments less than 3% by weight, and in other embodiments less than 2% by weight, as determined by measuring, at room temperature, the amount of toluene-insoluble material in the polymers.

The polymers of this invention are particularly useful in preparing rubber compositions that can be used to manufacture tire components. Rubber compounding techniques and the additives employed therein are generally disclosed in The Compounding and Vulcanization of Rubber, in Rubber Technology ($2^{nd}$ Ed. 1973).

The rubber compositions can be prepared by using the polymers of this invention alone or together with other elastomers (i.e., polymers that can be vulcanized to form compositions possessing rubbery or elastomeric properties). Other elastomers that may be used include natural and synthetic rubbers. The synthetic rubbers typically derive from the polymerization of conjugated diene monomers, the copolymerization of conjugated diene monomers with other monomers such as vinyl-substituted aromatic monomers, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures.

The rubber compositions may include fillers such as inorganic and organic fillers. Examples of organic fillers include carbon black and starch. Examples of inorganic fillers include silica, aluminum hydroxide, magnesium hydroxide, mica, talc (hydrated magnesium silicate), and clays (hydrated aluminum silicates). Carbon blacks and silicas are the most common fillers used in manufacturing tires. In certain embodiments, a mixture of different fillers may be advantageously employed.

In one or more embodiments, carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of at least 20 $m^2/g$ and in other embodiments at least 35 $m^2/g$; surface area values can be determined by ASTM D-1765 using the cetyltrimethylammonium bromide (CTAB) technique. The carbon blacks may be in a pelletized form or an unpelletized flocculent form. The preferred form of carbon black may depend upon the type of mixing equipment used to mix the rubber compound.

The amount of carbon black employed in the rubber compositions can be up to about 50 parts by weight per 100 parts by weight of rubber (phr), with about 5 to about 40 phr being typical.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

In one or more embodiments, silicas may be characterized by their surface areas, which give a measure of their reinforcing character. The Brunauer, Emmet and Teller ("BET") method (described in J. Am. Chem. Soc., vol. 60, p. 309 et seq.) is a recognized method for determining the surface area. The BET surface area of silica is generally less than 450 $m^2/g$. Useful ranges of surface area include from about 32 to about 400 $m^2/g$, about 100 to about 250 $m^2/g$, and about 150 to about 220 $m^2/g$.

The pH's of the silicas are generally from about 5 to about 7 or slightly over 7, or in other embodiments from about 5.5 to about 6.8.

In one or more embodiments, where silica is employed as a filler (alone or in combination with other fillers), a coupling agent and/or a shielding agent may be added to the rubber compositions during mixing in order to enhance the interaction of silica with the elastomers. Useful coupling agents and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172

5,696,197, 6,608,145, 6,667,362, 6,579,949, 6,590,017, 6,525,118, 6,342,552, and 6,683,135, which are incorporated herein by reference.

The amount of silica employed in the rubber compositions can be from about 1 to about 100 phr or in other embodiments from about 5 to about 80 phr. The useful upper range is limited by the high viscosity imparted by silicas. When silica is used together with carbon black, the amount of silica can be decreased to as low as about 1 phr; as the amount of silica is decreased, lesser amounts of coupling agents and shielding agents can be employed. Generally, the amounts of coupling agents and shielding agents range from about 4% to about 20% based on the weight of silica used.

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly Vulcanization Agents and Auxiliary Materials, pgs. 390-402, and A. Y. Coran, Vulcanization, ENCYCLOPEDIA OF POLYMER SCIENCE AND ENGINEERING, ($2^{nd}$ Ed. 1989), which are incorporated herein by reference. Vulcanizing agents may be used alone or in combination.

Other ingredients that are typically employed in rubber compounding may also be added to the rubber compositions. These include accelerators, accelerator activators, oils, plasticizer, waxes, scorch inhibiting agents, processing aids, zinc oxide, tackifying resins, reinforcing resins, fatty acids such as stearic acid, peptizers, and antidegradants such as antioxidants and antiozonants. In particular embodiments, the oils that are employed include those conventionally used as extender oils, which are described above.

All ingredients of the rubber compositions can be mixed with standard mixing equipment such as Banbury or Brabender mixers, extruders, kneaders, and two-rolled mills. In one or more embodiments, the ingredients are mixed in two or more stages. In the first stage (often referred to as the masterbatch mixing stage), a so-called masterbatch, which typically includes the rubber component and filler, is prepared. To prevent premature vulcanization (also known as scorch), the masterbatch may exclude vulcanizing agents. The masterbatch may be mixed at a starting temperature of from about 25° C. to about 125° C. with a discharge temperature of about 135° C. to about 180° C. Once the masterbatch is prepared, the vulcanizing agents may be introduced and mixed into the masterbatch in a final mixing stage, which is typically conducted at relatively low temperatures so as to reduce the chances of premature vulcanization. Optionally, additional mixing stages, sometimes called remills, can be employed between the masterbatch mixing stage and the final mixing stage. One or more remill stages are often employed where the rubber composition includes silica as the filler. Various ingredients including the polymers of this invention can be added during these remills.

The mixing procedures and conditions particularly applicable to silica-filled tire formulations are described in U.S. Pat. Nos. 5,227,425, 5,719,207, and 5,717,022, as well as European Patent No. 890,606, all of which are incorporated herein by reference. In one embodiment, the initial masterbatch is prepared by including the polymer and silica in the substantial absence of coupling agents and shielding agents.

The rubber compositions prepared from the polymers of this invention are particularly useful for forming tire components such as treads, subtreads, sidewalls, body ply skims, bead filler, and the like. In one or more embodiments, these tread or sidewall formulations may include from about 10% to about 100% by weight, in other embodiments from about 35% to about 90% by weight, and in other embodiments from about 50% to about 80% by weight of the polymer of this invention based on the total weight of the rubber within the formulation.

Where the rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Example 1

The polymerization reactor included a one-gallon stainless cylinder equipped with a mechanical agitator (shaft and blades) capable of mixing high viscosity polymer cement. The top of the reactor was connected to a reflux condenser system for conveying, condensing, and recycling the 1,3-butadiene vapor developed inside the reactor throughout the duration of the polymerization. The reactor was also equipped with a cooling jacket chilled by cold water. The heat of polymerization was dissipated partly by internal cooling through the use of the reflux condenser system, and partly by external cooling through heat transfer to the cooling jacket.

The reactor was thoroughly purged with a stream of dry nitrogen that was then replaced with 1,3-butadiene vapor by charging 100 g of dry 1,3-butadiene monomer to the reactor, heating the reactor to 65° C., and then venting the 1,3-butadiene vapor from the top of the reflux condenser system until no liquid 1,3-butadiene remained in the reactor. Cooling water was applied to the reflux condenser and the reactor jacket, and 1302 g of 1,3-butadiene monomer was charged into the reactor. After the monomer was thermostated at 12° C., 6.2 mL of 1.0 M triisobutylaluminum (TIBA) in hexane and 4.6 mL of 0.054 M nickel (II) neodecanoate borate (NiOB) in hexane was charged into the reactor. After stirring the solution for 5 minutes, 8.9 mL of 1.0 M boron trifluoride-hexanol-complex ($BF_3$.hexanol) was charged into the reactor and initiated polymerization. After 3.5 minutes from commencement of the polymerization, the temperature increased to 22° C., and the polymerization was terminated by diluting the polymerization mixture with 6.0 mL isopropanol dissolved in 1360 g of hexane and dropping the batch into 3 gallons of isopropanol containing 5 g of 2,6-di-tert-butyl-4-methylphenol. The coagulated polymer was drum-dried.

The yield of the polymer was 143.4 g (11.0% conversion), and the polymerization rate was calculated to be 3.1% conversion per minute. The Mooney viscosity ($MI_{1+4}$) of the polymer was determined to be 31.1 at 100° C. by using a Monsanto Mooney viscometer with a large rotor, a one-minute warm-up time, and a four minute running time. As determined by gel permeation chromatography (GPC), the polymer had a number average molecular weight ($M_n$) of 107,000, a weight average molecular weight ($M_w$) of 228,000, and a molecular weight distribution ($M_w/M_n$) of 2.1. The infrared spectroscopic analysis of the polymer indicated a cis 1,4-linkage content of 97.6%, a trans 1,4-linkage content of 1.8%, and a 1,2-linkage content of 0.6%. The gel content of the polymer was determined by measuring, at room temperature, the amount of toluene-insoluble material in the polymer sample, and the polymer was determined to be gel free.

Example 2 (Comparative Example)

The same procedure as used in Example 1 was used except that after 3.7 minutes from commencement of the polymerization, the temperature was allowed to increase to 37° C., and gel formation rapidly occurred on the walls of the reactor and on the shaft of the agitator. Upon gel formation, the polymerization was immediately terminated by diluting the polymerization mixture with 6.0 mL isopropanol dissolved in 1360 g of hexane. The polymer gel remained in the reactor while the remaining portion of the polymer was isolated by dropping the batch into 3 gallons of isopropanol containing 5 g of 2,6-di-tert-butyl-4-methylphenol. The coagulated polymer was drum-dried.

The yield of the isolated polymer was 152.6 g (11.7% conversion), although the actual yield was much higher due to the polymer gel remaining in the reactor. The reactor had to be cleaned by disassembling the reactor and removing the polymer gel from the reactor walls and agitator. The isolated polymer had the following properties: $ML_{1+4}$=33.5, Mn=111,000, Mw=223,000, Mw/Mn=2.0, cis-1,4-linkage content=97.6%, trans-1,4-linkage content=1.7%, and 1,2-linkage content=0.7%. Although the isolated polymer was determined to be gel free, a significant amount of polymer gel remained inside the reactor, as mentioned above. It was concluded that the overall gel content was very high, most likely greater than 20%, based upon the level of gel formation within the reactor.

A comparison of these results with those of Example 1 shows that allowing the polymerization to proceed to high conversions led to a rapid temperature increase that resulted in rapid gel formation inside the reactor. Accordingly, this example shows it is critical to control monomer conversion and polymerization temperature in order to avoid gel formation.

Example 3 (Comparative Example)

The same procedure as used in Example 1 was used except that 7.4 mL of 1.0 M TIBA in hexane was used, and the monomer was thermostated at 32° C. before the addition of the catalyst components. After 4.0 minutes from commencement of the polymerization, the temperature increased to 34° C., and gel formation rapidly occurred on the walls of the reactor and on the shaft of the agitator. Upon gel formation, the polymerization was immediately terminated by diluting the polymerization mixture with 6.0 mL isopropanol dissolved in 1360 g of hexane. Most of the polymer gel remained in the reactor while the polymer was isolated by dropping the batch into 3 gallons of isopropanol containing 5 g of 2,6-di-tert-butyl-4-methylphenol. The coagulated polymer was drum-dried.

The yield of the isolated polymer was 209.7 g (16.2% conversion) although the actual yield was much higher due to the polymer gel remaining in the reactor. The reactor had to be cleaned by disassembling the reactor and removing the polymer gel from the reactor walls and agitator. The isolated polymer had the following properties: $ML_{1+4}$=too high to measure, Mn=178,000, Mw=548,000, Mw/Mn=3.1, cis-1,4-linkage content=98.1%, trans-1,4-linkage content=1.4%, and 1,2-linkage content=0.5%. Although the isolated polymer was determined to be gel free, a significant amount of polymer gel remained inside the reactor, as mentioned above. It was concluded that the overall gel content was very high, most likely greater than 20%, based upon the level of gel formation within the reactor.

A comparison of these results with those of Example 1 shows that polymerization at high temperatures results in rapid gel formation, which suggests the criticality of conducting the polymerization at low temperatures.

Example 4

The same procedure as used in Example 1 was used except that 5.9 mL of 1.0 M TIBA in hexane was used, and 1.7 mL (9.9 mmol) of di-n-butyl ether ($Bu_2O$) was added within 1 minute following the addition of $BF_3$.hexanol. After 5.0 minutes from commencement of the polymerization, the temperature increased to 19° C., and the polymerization was terminated by diluting the polymerization mixture with 6.0 mL isopropanol dissolved in 1360 g of hexane and dropping the batch into 3 gallons of isopropanol containing 5 g of 2,6-di-tert-butyl-4-methylphenol. The coagulated polymer was drum-dried.

The yield of the polymer was 134.0 g (10.3% conversion), and the polymerization rate was calculated to be 2.1% conversion per minute. The resulting polymer had the following properties: $ML_{1+4}$=36.3, Mn=113,000, Mw=265,000, Mw/Mn=2.3, cis-1,4-linkage content=97.7%, trans-1,4-linkage content=1.8%, and 1,2-linkage content=0.5%. The polymer was determined to be gel free.

A comparison of theses results with those of Example 1 shows that the addition of di-n-butyl ether does not deleteriously impact the properties of the polymer and yet provides a slower polymerization rate.

Example 5

The same procedure used in Example 1 was used except that 7.4 mL of 1.0 M TIBA in hexane was used and 0.62 mL 0.4 M pyridine was added within 1 minute following the addition of $BF_3$.hexanol. After 10.6 minutes from commencement of the polymerization, the temperature increased to 17° C., and the polymerization was terminated by diluting the polymerization mixture with 6.0 mL isopropanol dissolved in 1360 g of hexane and dropping the batch into 3 gallons of isopropanol containing 5 g of 2,6-di-tert-butyl-4-methylphenol. The coagulated polymer was drum-dried. The yield of the polymer was 170.9 g (13.1% conversion) and the polymerization rate was calculated to be 1.2% conversion per minute. The resulting polymer had the following properties: $ML_{1+4}$=30.3, Mn=108,000, Mw=226,000, Mw/Mn=2.1, cis-1,4-linkage content=97.3%, trans-1,4-linkage content=2.2%, and 1,2-linkage content=0.5%. The polymer was determined to be gel free.

A comparison of these results with those of Example 1 shows that the addition of pyridine does not deleteriously impact the properties of the polymer and yet provides a slower polymerization rate.

Various modifications and alterations that do not depart from the scope and spirit of this invention will become apparent to those skilled in the art. This invention is not to be duly limited to the illustrative embodiments set forth herein.

What is claimed is:

1. A process for preparing a polydiene, the process comprising the step of:
polymerizing conjugated diene monomer with a nickel-based catalyst system, where said step of polymerizing takes place within a polymerization mixture that includes less than 20% by weight of organic solvent based on the total weight of the polymerization mixture, where the temperature of the polymerization mixture is maintained below 25° C. during said step of polymerizing, and where the conversion of the conjugated diene monomer is maintained below 12%.

2. The process of claim 1, where the nickel-based catalyst system is the combination or reaction product of (a) a nickel-containing compound, (b) an alkylating agent, and (c) a fluorine source.

3. The process of claim 2, where the nickel-containing compound is selected from the group consisting of nickel carboxylates, nickel carboxylate borates, nickel organophosphates, nickel organophosphonates, nickel organophosphinates, nickel carbamates, nickel dithiocarbamates, nickel xanthates, nickel β-diketonates, nickel alkoxides or aryloxides, nickel halides, nickel pseudo-halides, nickel oxyhalides, and organonickel compounds.

4. The process of claim 2, where the alkylating agent is defined by the formula $AlR_nX_{3-n}$, where each R independently can be is a monovalent organic group that is attached to the aluminum atom via a carbon atom, where each X independently is a hydrogen atom, a halogen atom, a carboxylate group, an alkoxide group, or an aryloxide group, and where n is an integer in the range of from 1 to 3.

5. The process of claim 2, where the fluorine source is selected from the group consisting of elemental fluorine, halogen fluorides, hydrogen fluoride, organic fluorides, inorganic fluorides, metallic fluorides, organometallic fluorides, and mixtures thereof.

6. The process of claim 2, where the nickel-containing compound is a nickel carboxylate borate, the alkylating agent is a trihydrocarbylaluminum compound, and the fluorine source is an inorganic fluoride.

7. The process of claim 6, where the inorganic fluoride is complexed with an alcohol.

8. The process of claim 2, where the molar ratio of the alkylating agent to the nickel-containing compound is from about 10:1 to about 50:1, and where the molar ratio of the fluorine source to the nickel-containing compound is from about 70:1 to about 130:1.

9. The process of claim 8, where the molar ratio of the alkylating agent to the nickel-containing compound is from about 20:1 to about 40:1, and where the molar ratio of the fluorine source to the nickel-containing compound is from about 80:1 to about 120:1.

10. The process of claim 1, where the polymerization mixture includes less than 5% by weight of organic solvent based on the total weight of the polymerization mixture.

11. The process of claim 1, where said step of polymerizing produces a polydiene having a cis-1,4-linkage content of at least 97%, a 1,2-linkage content of less than 1.0%, a molecular weight distribution of less than 3.0, a Mooney viscosity ($ML_{1+4}$@100° C.) of less than 60, and a gel content of less than 20%.

12. The process of claim 11, where the polydiene has a cis-1,4-linkage content of at least 98%, a 1,2-linkage content of less than 0.8%, a molecular weight distribution of less than 2.9, a Mooney viscosity ($ML_{1+4}$@100° C.) of less than 50, and a gel content of less than 10%.

13. The process of claim 12, where the conjugated diene monomer is 1,3-butadiene.

14. The process of claim 1, where the polymerization mixture includes a modulating Lewis base.

15. The process of claim 1, where the polymerization mixture is devoid of a molecular weight regulator.

16. The process of claim 1, where the polymerization conversion rate is about 1.2% to about 3.1% per minute.

17. The process of claim 9, where the polymerization conversion rate is about 1.2% to about 3.1% per minute.

* * * * *